United States Patent Office 3,453,184
Patented July 1, 1969

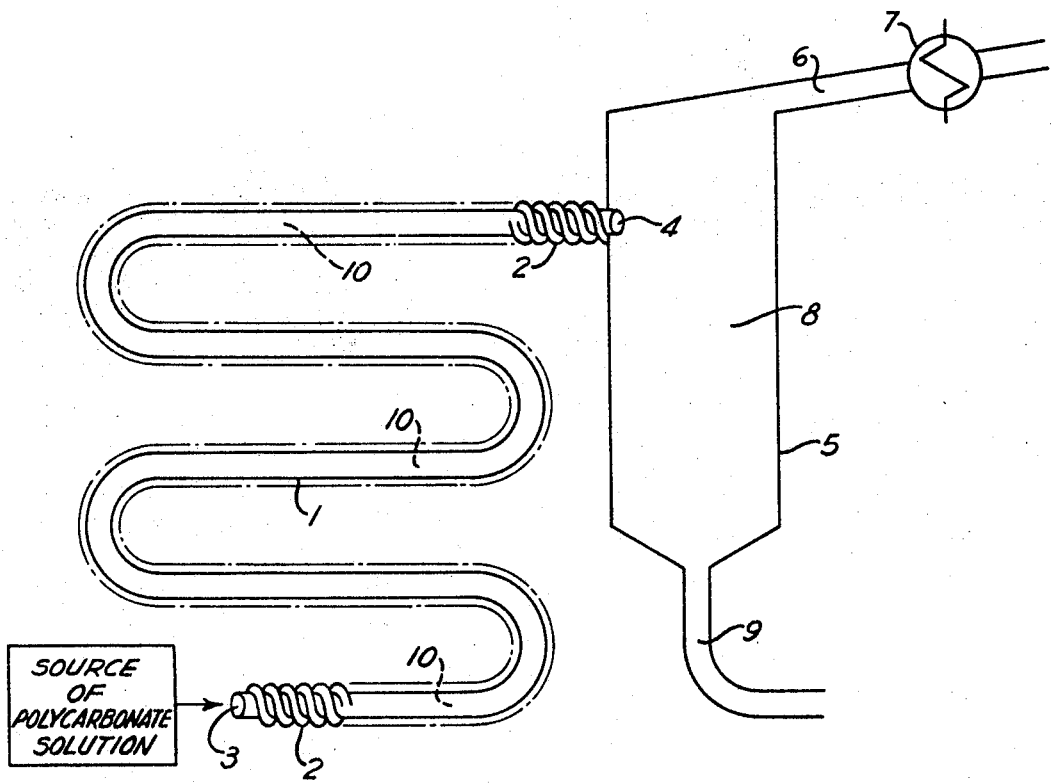

3,453,184
REMOVAL OF HIGH AND LOW BOILING SOLVENTS FROM POLYCARBONATE SOLUTIONS
Alois M. Gemassmer, Pittsburgh, Pa., and Herbert L. Rawlings, New Martinsville, W. Va., assignors to Mobay Chemical Company, Pittsburgh, Pa., a corporation of Delaware
Continuation of abandoned application Ser. No. 312,178, Sept. 27, 1963. This application Mar. 10, 1967, Ser. No. 622,365
Int. Cl. B01d 3/06, 1/12
U.S. Cl. 203—88      3 Claims

ABSTRACT OF THE DISCLOSURE

A process for removing volatiles from a substantially anhydrous polycarbonate solution by introducing the polycarbonate solution into the inlet end of a heated conduit having as its only openings an inlet means at one end and an outlet means at the other end, impelling the solution through the length of the conduit at a high rate of speed in a short residence time by an internally maintained pressure provided by the feed pressure of the solution and the pressure developed internally by the volatile components of the solution which evolve and traverse the conduit at a higher velocity than the solution itself, and simultaneously flashing off the volatile components and discharging the flowable polycarbonate from the outlet into the collection vessel.

---

This is a continuation of abandoned application Ser. No. 312,178, filed Sept. 27, 1963.

This invention relates to polycarbonates and more particularly to a novel process for the recovery of solid polycarbonates from a solution thereof.

There are known in the prior art various methods for making polycarbonates. Probably the most successful commercial process is described in U.S. Patent 3,028,365, wherein 2,2-bis(4-hydroxy phenyl)-propane is phosgenated to the desired polycarbonate material. This dihydroxy diphenyl propane is usually referred to as "Bisphenol A." The phosgenation step is carried out in the presence of an inert organic solvent such as, for example, methylene chloride; thus resulting in a product in solution form. It is more desirable that the polycarbonate be available in solid rather than liquid form; this is particularly true in the molding steps used. Also, the solid rather than liquid form of the polycarbonate is desired for ease of handling, transportation and storing.

There are several methods presently known for the recovery of the polycarbonate from a solution, some of which are (1) precipitation procedures, (2) direct evaporation methods and (3) extrusion processes. The latter process usually involves the use of extremely elevated temperatures whereby the solvent is volatilized and the solid portion maintained in a molten condition. There have been a number of difficulties associated with this procedure, the more serious ones being degradation and discoloration of the resulting polycarbonate solid. It is required for effective extrusion processes that the retention time of the material be extended and that the heat used be quite substantial. Since polycarbonates are somewhat heat-sensitive materials, the use of these long retention times at elevated temperatures can and very often does cause color problems in the product. Also a problem in using extruders to recover the solid polycarbonate is the clogging of the system due to the sticking of the solid polycarbonate on the mechanical conveying means such as screw conveyors and other exposed metal parts. This is believed to be caused by the solvent flashing off at such a high rate that the solid remaining is no longer in a flowable condition.

To avoid these degradation and discoloration problems, direct evaporation procedures have been suggested whereby the use of elevated temperatures is avoided. These procedures involve heating the polycarbonate solution over an extended period of time at somewhat lower temperatures and thus affecting evaporation of solvent at slow rates. While this expediency has improved the color stability and degradation properties of the product polycarbonate, other problems are encountered such as polycarbonate solid in a hard, horny mass or in a fluffy physical form depending upon the process employed. These polycarbonate solids are substantially useless for commercial application. A further disadvantage of extruder and evaporation recovery processes is the limited capacities of these systems when adapted to commercial application.

It is, therefore, an object of this invention to provide a process for the removal of polycarbonate from a solution thereof which is devoid of the above-noted disadvantages. A further object of this invention is to provide an economical process for the removal of polycarbonate from solution which is available at low capital and low maintenance costs, while possessing an increased capacity. Another object of this invention is to provide a process for the recovery of polycarbonate from a solution whereby discoloration or degradation of the final product is minimized or avoided. A still further object of this invention is to provide a process for the recovery of polycarbonate whereby the resulting solvent-lean polycarbonate is in a physical form easily adapted to further processing. Another object of this invention is to provide a process for recovering polycarbonates from a solution where internal mechanical solution conveying means such as screw conveyors are not required. A yet further object of this invention is to provide a process for the recovery of polycarbonates from solution by the use of a system having an extremely high capacity and more readily adaptable to commercial application than the heretofore known processes.

The foregoing objects and others which will become apparent from the following description are accomplished in accordance with this invention, generally speaking, by providing a process for removing volatiles from a substantially anhydrous polycarbonate solution whereby said solution is introduced into a fistulous heated zone and moved throughout the length of said heated zone by an internally sustained pressure while allowing said volatiles to freely escape from an open end terminal portion of said zone. The pressure internally maintained in said zone is provided by the feed pressure and/or the pressure developed internally by the volatilization of the liquid components in said solution. The solvent-lean polycarbonate and the solvent vapors both are freely discharged from the heated zone housed in a tubular conduit through the terminal end portion of said conduit. The solvent present in the solution upon volatilization traverses the tube conduit at a higher velocity than the concentrated solution and serves as an aid in propelling the remaining concentrate through the length of the conduit or heated zone. Since the pressure caused by the vaporized solvent and/or the initial feed pressure applied is more than sufficient to impel the solution at a high rate of speed through the conduit, problem-causing mechanical conveying means such as screws or other conveyors are not required. As the solvent and flowable polycarbonate (concentrated polycarbonate solution and/or molten polycarbonate) approach the discharge end of the tubular conduit, the solvent is flashed off and the solvent-lean polycarbonate is discharged into a collection vessel. While the polycarbonate feed solution may contain insignificant residual or small amounts of water, anhydrous or solutions substantially anhydrous are preferred. By providing impetus to the solution without need of a mechanical conveying means, a major problem present in extruding and other heretofore known methods is avoided. Also, because of the high rate of speed and short residence time of the solution in the heated tubular medium, there is less danger of product degradation due to excessive exposure to heat. Polycarbonates being somewhat heat-sensitive at high temperatures, this degradation problem has been of particular concern. The tubular conduit may be constructed in a substantially vertical manner thus allowing the pull of gravity alone or together with the feed pressure to move the polycarbonate solution without the required use of mechanical or external pressure means.

When a substantially solvent-free polycarbonate product is desired, best results are obtained when the feed pressure is at least about 100 p.s.i.g. and the temperature maintained at least above the melting point of the polycarbonate. After the solvent-lean polycarbonate product is discharged from the tube conduit, it is collected as a liquid and conveniently further processed in other drying and/or processing means. The percentage of solvent remaining in the product may be reduced by the present invention down to 1% preferred figure. It is also possible by the present process to remove part of the solvent and thereby retain in the final product significant amounts of solvent. Also when a mixture of two or more solvents is used, the lower boiling solvent may be removed by heating the solution at least to just above the boiling point of the lower boiling solvent, thereby obtaining as a product a more concentrated solution containing only the higher boiling solvent or solvents. Thus, when a mixture of two solvents is used, the temperature is maintained between the boiling points of the solvents, thereby removing the lower boiling solvent and retaining in the more concentrated product, the higher boiling solvent. The polycarbonate product thus may vary from a more concentrated solution (than the concentration of the initial solution) to a melt comprising essentially 100% polycarbonate. The polycarbonate product may be directly fed to other processing means such as further drying means or to a pelletizer to be converted into the final solid form.

The tube conduit may be constructed of any suitable material such as metal, glass-lined metals and the like. The inner diameter of the conduit must be at least large enough so that the pressure used overcomes the pressure drop due to resistance to the flow of viscous polymer. Various solvents and/or liquid carriers may be used in the feed of the process of this invention. Typical solvents are tetrachloroethane, ethylene chloride, chloroform, methylene chloride, trichloroethane, dichloroethane, thiophene, dioxane, tetrahydrofuran, chlorobenzene, benzene, dichlorobenzene and mixtures thereof. The process of this invention is adapted to be carried out under atmospheric pressure, under super-atmospheric pressure or under vacuum whichever is most convenient and most suitable for this particular purpose.

The concentration of the feed polycarbonate solution may vary under normal conditions from about 1 to about 30 to 40%; however, it is preferred for economic reasons, ease of handling and best results, to use a polycarbonate solution containing from about 7 to about 20% polycarbonate.

The following examples which are in relation to the accompanying drawing will further define the particulars of the present invention. The figure illustrated is a schematic view of the polycarbonate recovery system of the present invention. Parts and percentages are by weight unless otherwise specified.

Example 1

The tubular conduit 1 heated by a surrounding heating jacket 2 forms a fistulous heated zone 10 internally housed and extending therein throughout its length. Other convenient heating means than heat jacket 2 may be used if desired. In tubular conduit 1 an open feed end 3 is provided which receives the substantially anhydrous polycarbonate solution in the initial step of the process and thus defines the terminal feed portion of fistulous heated zone 10. The term "fistulous" as used throughout this disclosure is meant to define a hollow zone formed by the internal portion of conduit 1. This zone remains throughout its length unobstructed by means other than the components fed thereto. The feed opening 3 may be in flowable contact with a polycarbonate production system whereby the substantially anhydrous polycarbonate solution may be directly fed therethrough. At the opposite end portion from feed opening 3 of tubular conduit 1 is an open discharge end or product terminal portion 4 which is adapted to permit the passage therethrough of the molten or concentrated polycarbonate and the solvent or other volatiles. In contact with this discharge opening 4 is a collection vessel 5 which is adapted to receive the polycarbonate product as it passes from heated fistulous zone 10 via discharge opening 4. At the upper portion of the collection vessel 5, is located a passage 6 through which the volatiles are permitted to pass to a condensing means 7. The volatiles, thereby pass through discharge opening 4 and are allowed to travel up through passage 6 to condensing means 7 where a portion of the volatiles may be collected or recycled. At the bottom of collection vessel 5 is a collection zone or chamber 8 where the molten and/or concentrated polycarbonate is collected after the volatilization is substantially completed. Leading from the zone or the collection chamber 8 is a collection vessel discharge opening 9 where the solvent-lean molten or concentrated polycarbonate may be drawn off and fed to a further processing means.

In the above alternative embodiment the polycarbonate solution containing the mixture of solvents after being introduced into conduit 1 is heated to a temperature above the boiling point of the low boiling solvent, but below the boiling point of the higher boiling solvent. A final polycarbonate solution having a concentration greater than that of the initial solution is thereby obtained. A preferred mixed solvent contains methylene chloride and monochlorobenzene. After the solution in either above embodiment is added to conduit 1, it is heated to the desired temperature to either completely remove the solvent or remove at least some or one solvent, retaining in the final polycarbonate solution significant amounts of solvent.

In an embodiment of this invention, a continuous stream of a 10% polycarbonate solution (made by the phosgenation of Bisphenol A by the method disclosed in U.S. Patent 3,028,365 using a methylene chloride or mixed solvent) is introduced into the tubular conduit 1 through inlet means 3. This solution is fed into the conduit 1 at a rate of about 45 lbs./hr. The feed pressure is maintained at from about 100 to about 250 p.s.i.g. The zone 10 and/or conduit 1 is heated through heat jacket 2 and maintained at a temperature of about 40 to about 310° C. throughout the process. In the second embodiment which is preferred, the 10% solution contains a mixture of two solvents, one a substantially low boiling and one a substantially high boiling solvent. The solution when the methylene chloride solvent present in the solution begins to be volatilized is propelled through said zone 10 at a higher velocity than is the remaining polycarbonate concentrate. The vapors developed by the methylene chloride assist in forcing the remainder of the concentrated polycarbonate solution (including any higher boiling solvents) through the length of zone 10 and provides a convenient means for assisting impetus of the polycarbonate solution without mechanical conveying means from inlet means 3 to discharge opening 4.

Example 2

The procedure of Example 1 is followed using a tubular conduit ¾″ SS, 1 PS, by 19½ ft. long. The feed pressure applied is varied from about 12 to about 30 p.s.i.g. The conduit is heated under nitrogen to a temperature of about 290 to 310° C. before feeding a 10% polycarbonate (same as that of Example 1) therethrough. The polycarbonate solution is fed therethrough at a rate of about 10 lbs./hr. for a period of about 6.5 hours. The final product obtained is a molten polycarbonate substantially solvent free.

Example 3

The same procedure as in Example 2 is followed except that the feed rate was increased to about 70 lbs./hr. The conduit is preheated to a temperature of about 310° C. to about 330° C. and a pressure drop of about 30 to 50 p.s.i.g. is developed. The residence time of the 10% polycarbonate feed solution is about 6 minutes. The final product obtained is a polycarbonate solution or slurry containing 15 to 50% polycarbonate solids and the remainder methylene chloride solvent.

Example 4

The same process as in Example 3 is followed except that the feed rate of the 10% polycarbonate solution used is varied through the range of about 240 to about 300 cc./min. Several runs are conducted using varying feed rates for periods of about 3.5 hours while heating at a temperature of about 300° C. The resulting concentrated polycarbonate products contain from about 0 to 65% solvent depending on feed rate used. The tube conduit used in this example is ½″ O.D. x 0.065″ wall x 12 ft. long.

Example 5

A procedure similar to that of the above examples is followed with the following conditions and results:

| Conduit temperature (° C.) | Feed rate as dry polycarbonate, lbs./hr. | Feed press, p.s.i.g. | Percent polycarbonate concentration in effluent product |
|---|---|---|---|
| 310 | 10.0 | 0 | 17.0 |
| 310 | 7.1 | 100 | 20.3 |
| 310 | 4.7 | 150 | 37.2 |
| 300 | 4.7 | 140 | 35.3 |
| 300 | 4.1 | 250 | 100.0 |

Although specific conditions and components are given in all the above examples to illustrate the invention, other equivalent means such as those disclosed above may be used.

Example 6

In a procedure similar to the above examples except using lower operating temperatures, the following run is conducted.

About 313 grams/min. of a polycarbonate solution containing 10% polycarbonate, 27% monochlorobenzene and 63% methylene chloride is fed to a pipe still similar to that used in the above examples. The feed was introduced into the inlet of the pipe still at a pressure of about 25 p.s.i.g., the feed temperature maintained at about 24° C. The pipe still consisted of 12 ft. of ½ inch O.D. stainless steel tubing enclosed in a jacket of pipe in which steam is admitted under controlled pressure. The cross-section of the tubing is 0.000746 ft.². The tube discharges into a chamber connected to a condenser. The jacket pressure is 23 p.s.i.g. steam. Under these conditions, the bottoms from the separating chamber are collected at a ratio of 90 grams/min. while the overhead condensate is 227 grams/min. The bottoms composition (product) by analysis is 37% polycarbonate and the remainder solvent consisting namely of monochlorobenzene. The overhead condensate is substantially all solvent comprising about 79% methylene chloride and the remainder monochlorobenzene. The bottoms material is free flowing at the discharge temperature of 74° C. which upon cooling will gel into a frangible dough. The discharge temperature of the pipe still is 75° C. and the vapor temperature is 73° C.

Example 7

A feed comprising about 1350 lbs./hr. polycarbonate, 8500 lbs./hr. methylene chloride, 3560 lbs./hr. monochlorobenzene and 13 lbs./hr. of water is fed to a pipe still under a pressure of about 25 p.s.i.g. at a feed temperature of 25° C. The pipe still consisted of a large commercial installation having the desired commercial capacity. The mixture was maintained at a temperature of about 75° C. to 80° C. throughout the process. The overhead condensate consisted of 1968 lbs./hr. monochlorobenzene, 8347 lbs./hr. methylene chloride and 13 lbs./hr. water. The product obtained in the bottoms composition contained 1350 lbs./hr. of polycarbonate, 1592 lbs./hr. monochlorobenzene and 153 lbs./hr. methylene chloride and is essentially free of esters. The product analyzed as a composition containing about 43.5% polycarbonate, about 51.4% monochlorobenzene and about 4.95% methylene chloride. The product obtained is free flowing at the discharge temperature of 75° C. for a short period of time, after which it must be heated to elevated temperatures to maintain it in a liquid form (155° C. under 15 to 20 p.s.i.g.).

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A process for removing the volatile components from a substantially anhydrous solution of a polycarbonate in a solvent system comprising a low boiling solvent and a high boiling solvent which comprises introducing the polycarbonate solution into the inlet end of a heated conduit having as its only openings an inlet means at one end and an outlet means at the other end, heating the solution in the conduit to a temperature of from the boiling point of the low boiling solvent up to but not including the boiling point of the higher boiling solvent, impelling the solution through the length of the conduit at a high rate of speed in a short residence time by an internally maintained pressure provided by the feed pressure of the solution and the pressure developed internally by the volatile components of the solution which evolve and traverse the conduit at a higher velocity than the solution itself, and simultaneously flashing off the volatile components and discharging flowable polycarbonate from the outlet into the collection vessel.

2. The method of claim 1 wherein the low boiling solvent is methylene chloride and the high boiling solvent is monochlorobenzene.

3. The method of claim 1 wherein the polycarbonate solution is recovered substantially free of the lower boiling liquid.

References Cited

UNITED STATES PATENTS

| 2,467,769 | 4/1949 | Morrow et al. | 203—88 X |
| 2,500,194 | 4/1950 | McConnell et al. | 202—177 X |
| 2,992,679 | 7/1961 | Twaddle | 159—2 |
| 3,022,271 | 2/1962 | Darr et al. | 260—47 |
| 3,167,531 | 1/1965 | Parker et al. | |
| 3,201,365 | 8/1965 | Charlesworth et al. | 260—34.2 |
| 3,234,109 | 2/1966 | Lustenalder | 203—88 X |
| 3,240,755 | 3/1966 | Cawthon et al. | 260—47 |

WILBUR L. BASCOMB, JR., *Primary Examiner.*

F. E. DRUMMOND, *Assistant Examiner.*

U.S. Cl. X.R.

202—177; 203—91; 260—47, 77.5, 33.8